Aug. 29, 1939.  C. R. ANDERSON  2,171,350
CARD HOLDER
Filed Dec. 17, 1936
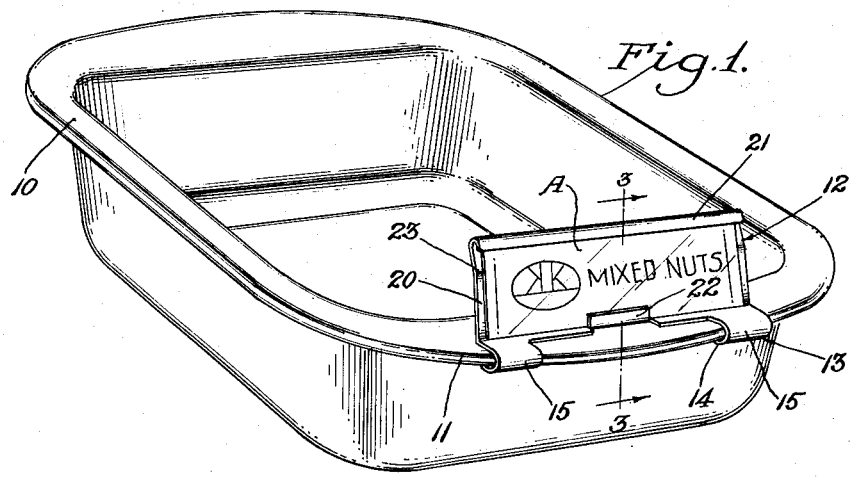
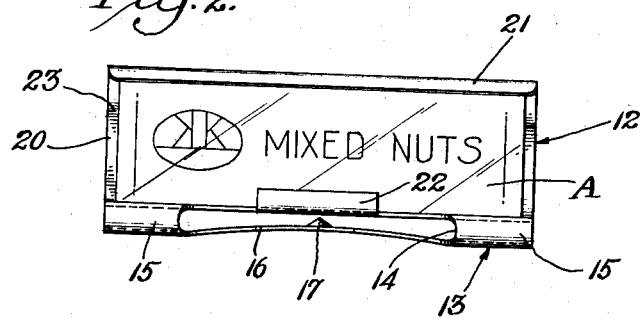
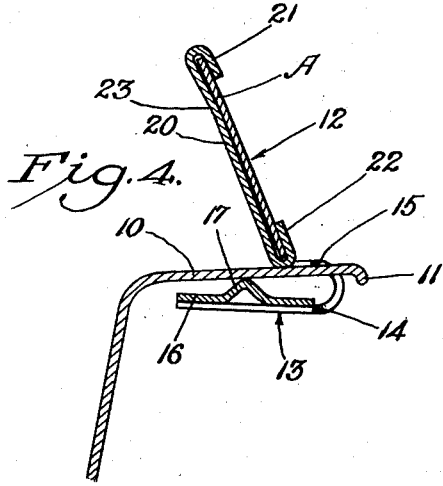
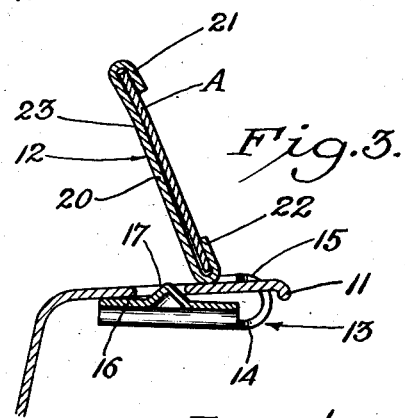
Inventor
Charles Ralph Anderson
BY
Parker, Carlson, Pitzner & Hubbard
Attorneys.

Patented Aug. 29, 1939

2,171,350

UNITED STATES PATENT OFFICE 2,171,350

CARD HOLDER

Charles Ralph Anderson, Chicago, Ill.

Application December 17, 1936, Serial No. 116,281

7 Claims. (Cl. 40—16)

The invention relates generally to card holders and more particularly to a card holder adapted to be attached to a pan or the like.

The general object of the invention is to provide a holder for a card such as a price card, adapted to be detachably attached to a pan or the like, which is simple and inexpensive in its construction and which is firmly held in place.

It is also an object to provide a card holder constructed so that it may be attached to pans of different peripheral shapes.

Another object is to provide a holder of the foregoing general character, which permits a card to be easily inserted therein, and which firmly holds the card in place after insertion.

Other objects and advantages will become apparent from the following description taken in connection with the accompanying drawing, in which:

Figure 1 is a perspective view of a pan having attached thereto a device embodying the features of the invention.

Fig. 2 is a front elevational view of the device.

Fig. 3 is a vertical section taken on the line 3—3 of Fig. 1.

Fig. 4 is a view similar to Fig. 3 but showing the device mounted on a pan of slightly different construction.

A device embodying the features of the invention is adapted for use on pans such as those commonly employed in the sale of nut meats. Such a pan is illustrated in Fig. 1 and is generally rectangular and shallow and having a substantially horizontal or outstanding flange 10 about its upper edge, the pan being of the porcelain enamel type and with the flange provided with a bead 11 at its periphery. It is understood that the pan shown herein is merely for illustrative purposes and that a device embodying the invention is not limited to use in connection with a pan of the exact structure shown.

The preferred embodiment of the invention comprises generally a card-holding portion and a clip portion. The card-holding portion is provided with means along its longitudinal edges to provide grooves to receive the card. To insure holding the card firmly in place the card-holding portion is bent along a longitudinal line so that the card must be slightly bowed to be inserted.

The clip portion is of generally channel-shaped cross-section having its web cut away intermediate its ends so that the device may be slipped over pans of different peripheral shapes. A portion of the channel shape is longitudinally bowed to provide a resilient clamping means for holding the device firmly in place.

As shown in the drawing, the device comprises a card-holding portion indicated generally at 12 and a clip portion indicated generally at 13. The clip portion is of generally channel or U-shaped cross-section adapted to be slipped over the flange 10 of the pan with the flange 10 embraced by the arms of the U-shape. In order that the clip portion may fully engage the flange 10 regardless of the particular peripheral shape of the pan, the web of the channel-shaped portion is cut away intermediate its ends, as at 14, to provide a pair of members 15 at the respective ends of the device. Thus, as shown in the drawing, where the flange 10 of the pan is peripherally rounded, the cutting away permits the flange of the pan to project through the cut and permits the end parts or members to be fully slid onto the flange.

By cutting the metal away, as shown at 14, a strip 16 severed longitudinally from adjacent metal and connecting the two end members 15 remains. To firmly clamp the device on the flange 10 the strip 16 is preferably bowed longitudinally of the device, as shown clearly in Fig. 2, the metal of which the device is made preferably being of a resilient character so that the device is yieldingly held in place. Since the flange 10 of the pan is usually provided with a bead 11 at its periphery, the bowing of the strip 16 permits it to spring up against the pan inwardly of the bead so that it cannot accidentally be disengaged from the pan.

As a further means for firmly holding the clip in its proper position on the pan, a small boss 17 may be formed at the midpoint of the 16 by indenting the metal. The boss is adapted to enter and coact with a hole in the flange 10, as illustrated in Fig. 3. If there is no hole in the flange, as illustrated in Fig. 4, the boss merely bears against the face of the flange.

The card-holding portion of the device comprises a plate or panel 20 having its outer edge reversely bent as at 21 to provide a groove to receive the one edge of the card. At the opposite edge of the panel 20 a portion of the metal adjacent the cut 14 is slit and bent reversely on the panel as at 22 to provide an oppositely facing groove for the other edge of the card. The card, illustrated at A, utilized with the device is preferably of slightly less width than the panel, so that it may be readily slid into the grooves formed by the portions 21 and 22. In order to hold the card securely in place, the panel is bent along a longitudinal line out of a plane, as illustrated at 23, so as to necessitate bowing the card slightly to insert it in the grooves. Thus when the card is in place, the resilience of the card holds its edges firmly against the sides of the grooves formed by the bent portions 21 and 22 of the card-holding portion, whereby the card is frictionally held in place without danger of its being accidentally shifted from its proper position.

In the device shown herein, the card-holding portion is generally upstanding, while the clip portion is adapted to fit over a horizontal flange on the pan. It is within the scope of the intion, however, to utilize the device in connection with a pan with or without a flange, the particular angle between the card-holding portion and the clip portion being varied to suit circumstances.

From the foregoing, it will be apparent that I have provided a card holder adapted to be readily attached to a pan or the like, which is simple and inexpensive in construction and which is firmly held in place. It is apparent that the holder is adapted for attachment to pans of different peripheral shapes or sizes and is resiliently held in place. The device permits a card to be readily inserted and firmly holds the card in place.

I claim as my invention:

1. A device of the character described comprising, in combination, an upstanding card-holding portion, and a clip portion, the latter comprising a pair of spaced U-shaped members adapted to slip over the edge portion of a pan, one arm of each member being attached to the card-holding portion, and a strip connecting the other arms of said members and bowed to bear against one face of said edge portion of the pan.

2. A device of the character described comprising, in combination, an upstanding card-holding portion, and a clip portion, the latter being of generally U-shaped form adapted to slip over the edge of a pan and having one of its sections attached to the card-holding portion, the clip sections being severed from each other short of their opposite ends, one of said sections being longitudinally bowed to bear against the pan and frictionally hold the device in place.

3. A card-holding device adapted to be secured to a pan having a beaded edge, comprising, in combination, a card-holding portion, and a clip portion, the latter having a generally U-shaped form to fit over the edge of the pan, one arm of the U being attached to the card-holding portion, the web portion of the U being cut away intermediate its ends to permit the beaded edge of the pan to extend therethrough, the other arm of the U being longitudinally bowed to bear against the pan inwardly of the bead thereon.

4. A device adapted to fit over the edge of a pan having a hole therein, said device having a clip portion of channel-shaped form with the web thereof cut away intermediate its ends and one arm longitudinally bowed to clamp the device in place, said bowed arm having a boss adapted to coact with the hole in the pan to hold the device in place.

5. A device of the character described comprising a rectangular piece of sheet metal longitudinally slotted and bent along the line of the slot to provide a channel-shaped clip portion to receive the edge of a pan, the metal at one side of said slot being longitudinally bowed to clamp against the edge of the pan, said sheet of metal being bent to provide a card-holding portion with the outer edge thereof bent inwardly and a portion of the metal at the slot bent oppositely to provide grooves to receive the card.

6. A device of the character described having a clip portion comprising a pair of spaced U-shaped members adapted to slip over the edge of a pan and a pair of elongated strips connecting the corresponding arms of said U-shaped members, one of said strips being substantially flat and the other being longitudinally resilient and bowed to exert a resilient clamping pressure on the pan.

7. A device of the character described embodying a clip portion of generally U-shape with the web connecting the opposed sections of the clip having a cut-out intermediate and short of its ends to receive the edges of pans of different shapes, one of said sections being resiliently bowed longitudinally along said cut-out to engage resiliently with and clamp the device onto the edge of an associated pan.

CHARLES RALPH ANDERSON.